No. 727,833. PATENTED MAY 12, 1903.
C. A. PFANSTIEHL, L. A. PEASE & J. A. BRADY.
RAILWAY MAIL COLLECTION DEVICE.
APPLICATION FILED DEC. 1, 1902.

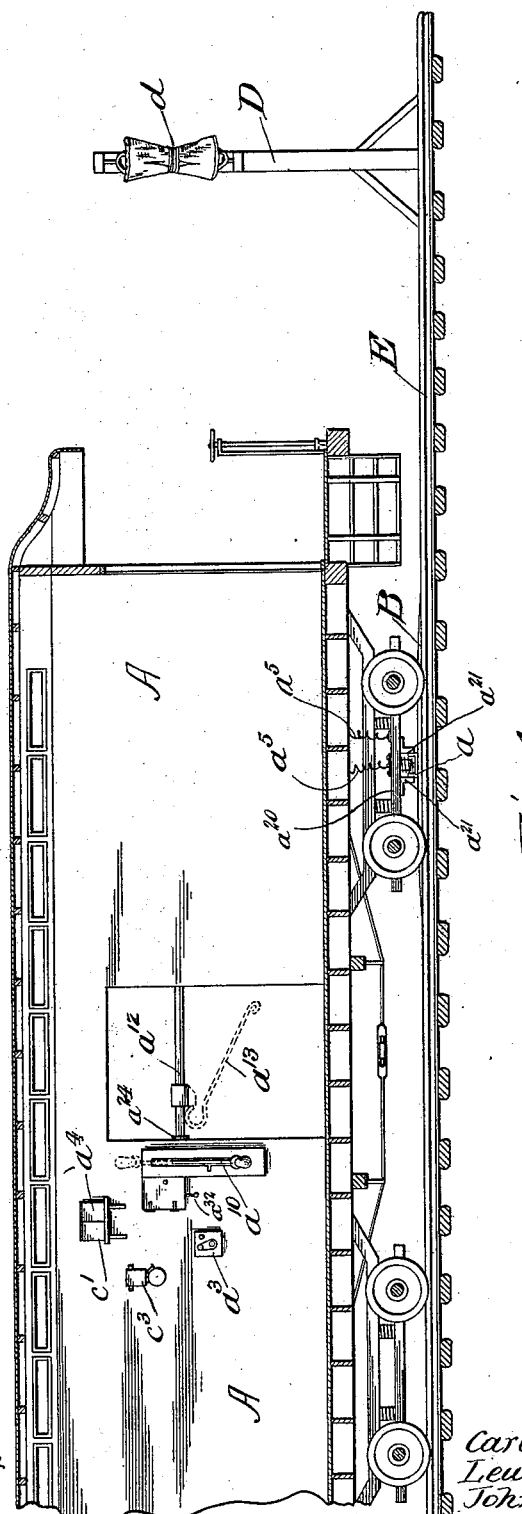

NO MODEL. 4 SHEETS—SHEET 2.

Witnesses:
Watson Hurlburt
H. Y. Michaelson

Inventors:
Carl A. Pfanstiehl
Lewis A. Pease
John A. Brady
By Charles S. Hill, their Atty No. 727,833. PATENTED MAY 12, 1903.
C. A. PFANSTIEHL, L. A. PEASE & J. A. BRADY.
RAILWAY MAIL COLLECTION DEVICE.
APPLICATION FILED DEC. 1, 1902.
NO MODEL. 4 SHEETS—SHEET 3.
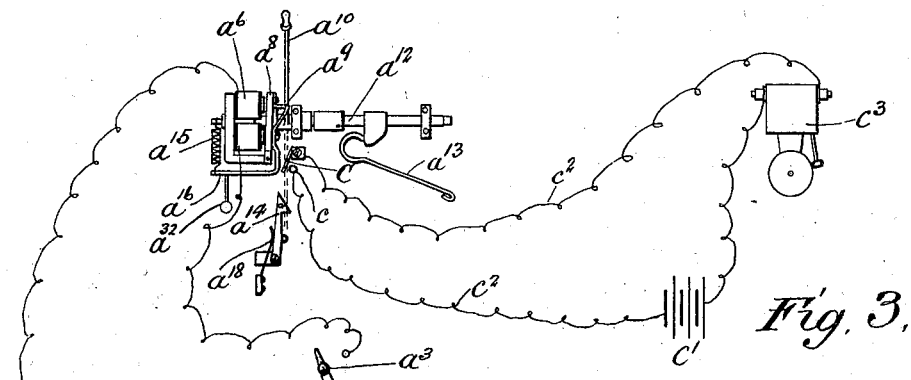
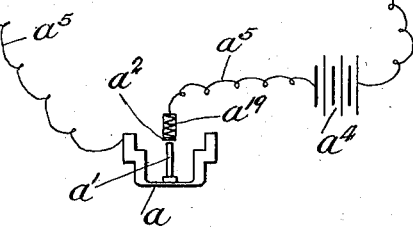
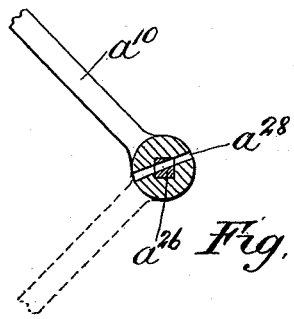
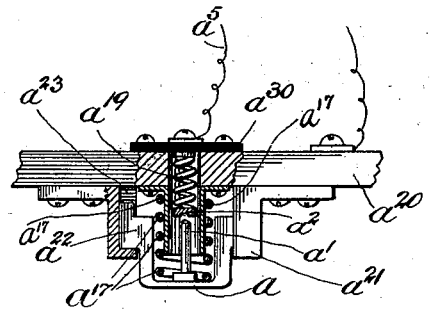
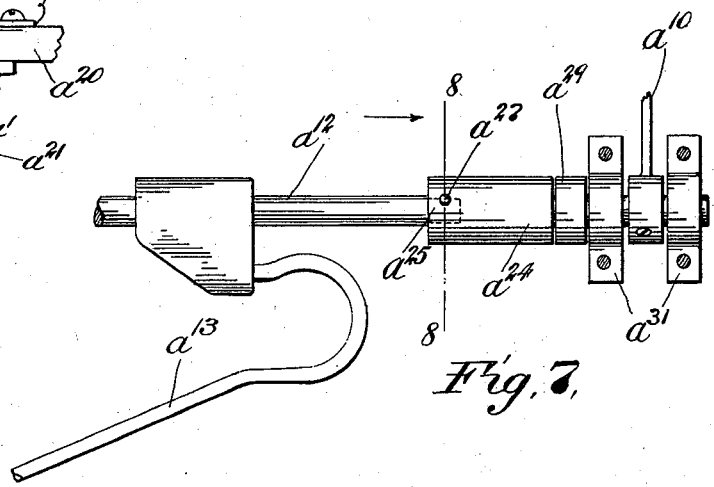
Witnesses:
Watson Hurlburt
H. Y. Michaelson
Inventors:
Carl A. Pfanstiehl
Lewis A. Pease
John A. Brady
By Charles S. Hill, their Atty No. 727,833. PATENTED MAY 12, 1903.
C. A. PFANSTIEHL, L. A. PEASE & J. A. BRADY.
RAILWAY MAIL COLLECTION DEVICE.
APPLICATION FILED DEC. 1, 1902.
NO MODEL. 4 SHEETS—SHEET 4.
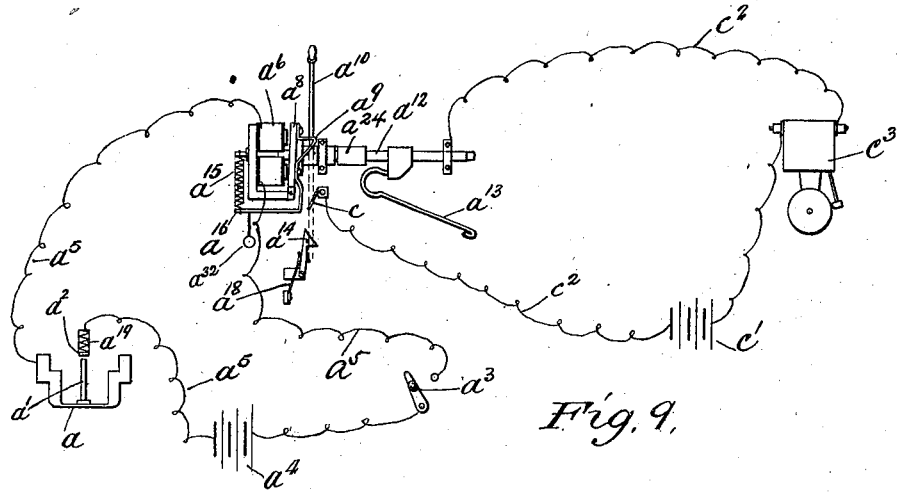
Fig. 9.
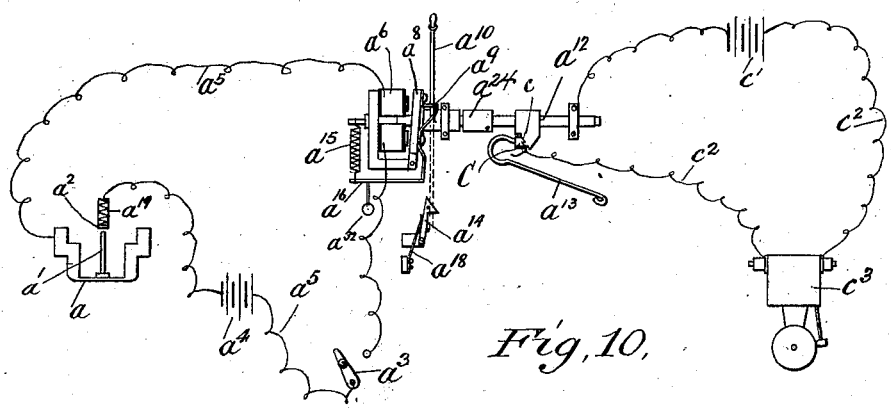
Fig. 10.
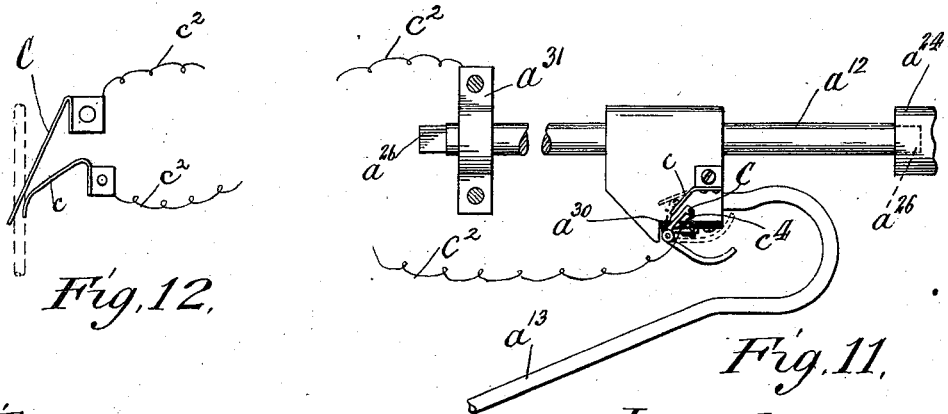
Fig. 12.
Fig. 11.
Witnesses:
Watson Hurlburt
H. Y. Michaelson
Inventors:
Carl A. Pfanstiehl
Lewis A. Pease
John A. Brady
By Charles S. Hill, their Atty No. 727,833. Patented May 12, 1903.

UNITED STATES PATENT OFFICE.

CARL A. PFANSTIEHL, OF HIGHLAND PARK, AND LEWIS A. PEASE AND JOHN A. BRADY, OF HIGHWOOD, ILLINOIS.

RAILWAY MAIL-COLLECTION DEVICE.

SPECIFICATION forming part of Letters Patent No. 727,833, dated May 12, 1903.

Application filed December 1, 1902. Serial No. 133,320½. (No model.)

*To all whom it may concern:*

Be it known that we, CARL A. PFANSTIEHL, a resident of Highland Park, and LEWIS A. PEASE and JOHN A. BRADY, residents of Highwood, in the county of Lake, State of Illinois, citizens of the United States, have invented certain new and useful Improvements in Railway Mail-Collection Devices, of which the following is a specification.

Our invention relates to railway mail-cars, while it more particularly relates to devices for transferring mail-bags or mail-containing receptacles of any kind whatsoever from a retaining gibbet, crane, or other mail-receptacle-delivery device to a railway-car while the latter is in motion.

In addition to the mere transference of a mail-pouch from a delivery device to a moving car the device of our invention is intended to and does effectively and economically accomplish certain meritorious and advantageous results, which so far as we know or have reason to believe are impossible to be accomplished by any device or devices now known to the art to which our invention pertains.

Figures 4, 5:
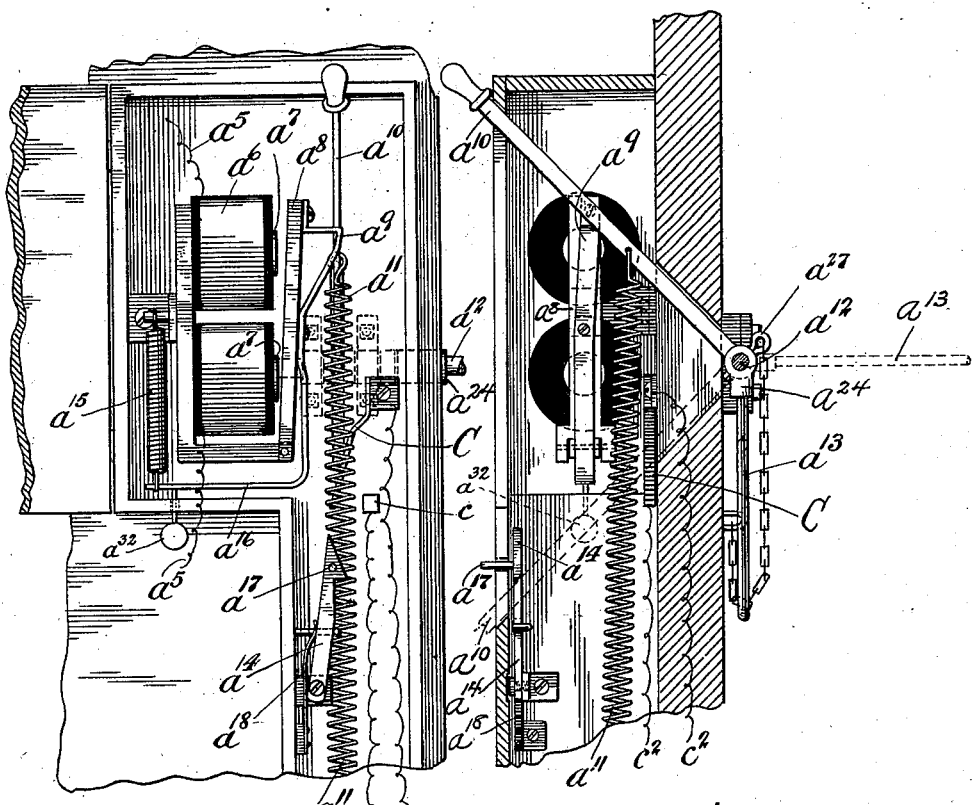
Figure 2:
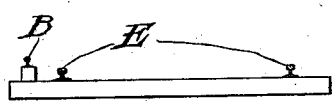

Referring to the accompanying drawings, wherein like reference-letters indicate the same or corresponding parts, Figure 1 is a view in elevation, partly in section. Fig. 2 is a cross-sectional view. Figs. 3, 9, and 10 are diagrammatic views. Fig. 4 is a front, and Fig. 5 is a side, elevation. Fig. 6 is in part a sectional view and in part an elevation. Fig. 7 is a fragmentary elevation. Fig. 8 is a fragmentary sectional view of a portion of the parts shown in Fig. 7, taken on the line 8 8 thereof and viewed in the direction indicated by the arrow at the side of said line. Fig. 11 is an elevation of a portion of the parts shown in Fig. 10, and Fig. 12 is an elevation of a modified form of certain of the parts shown in Fig. 3.

Heretofore and as at this time in common use throughout the United States the mail-collection device employed on railway-cars is a manually-operated lever which carries and actuates a bag-engaging hook. In employing this device certain of the railways require the engineer to signal to the mail-car "crew" by a whistle-blast or other signal means that the train is near a mail-crane, upon receiving which signal the clerk whose duty it is to collect the mail opens the door of the mail-car and manually swings the collecting-hook into operative position, where he is obliged to hold it until it has "picked up" the mail, following which he or another clerk removes the pouch to the interior of the car, the hook being permitted to assume its normal and inoperative position in a substantially parallel plane to the perpendicular plane of the side of the car to which it is attached. For failure to catch the pouch when "mail" has been properly signaled from the engine a fine is imposed upon one or more members of the mail crew, while the engine crew is subjected to a fine for failing to signal in time to permit of the mail being properly collected. It not infrequently happens that the engine crew are unable to tell their exact location with respect to the crane—are "lost." Hence they will signal "mail," that they may at once be relieved of responsibility and the liability to a fine be transferred to the mail crew. In the now-employed device the lever carrying the hook is made removable from its journals, sockets, or pivot-sleeves, that it being removed therefrom the doorway may be unobstructed. Being free to move longitudinally and pivotally the lever and its carried hook must be manually held by the operator against both of said movements. If the hook be lifted or depressed beyond a certain limit, the bag or pouch, if touched at all by the hook, may be merely swerved out of its position and the hook fail to secure it or it may be knocked from the crane to the ground. In either case a fine is imposed upon the one responsible for failure to catch the pouch, while in the latter case the pouch in its flight may, as has frequently been the case, cause great injury to itself, its contents, and to persons or objects with which it may come into contact. If the pouch be missed, as described, it must be collected by some later train or the train missing it must be "run back" and the mail picked up. In either event delay is caused, while in the latter case interference with the train-schedule and expense is occasioned the railway. If the road be dusty or the weather inclement or cold, the holding open of the mail-car door for a considerable time will not only cause discomfort to the hook operator, but to the other occupants of the car. Again, if the hook operator holds the lever in such manner that the impact of the pouch with the hook will drive the lever backward a serious injury may thereby result to him. Such injuries are of comparatively frequent occurrence. With the liability to a fine suspended over the heads of both the engine and mail crews and the dangers and discomforts incident to train-collection of mail by the present systems in use wholly unnecessary annoyance, worry, and danger are occasioned the crews, which, were they relieved therefrom, could, as they should, give their closest attention and effort to their work. The hook operator must, of course, give his entire time to "picking up" the mail when the mail-signal has been given him, and where these signals are of frequent occurrence it may even be necessary to employ a man for this duty alone. In making a run of, say, three hundred and eighty-five (385) miles with the usual number of "pick-ups" the amount of heat which will escape from the cars of the mail-train by reason of the mail-doors being opened in order that the mail may be picked up is considerable. This loss of heat must be compensated for. Hence the railway company must provide, the engine be required to consume, and the fireman and "coalers" be obliged to handle a greater or less quantity of coal in excess of the amount required to operate the engine and heat the air within the cars to a given temperature under normal conditions. In employing the device of our invention the mail-door need be opened but for a very brief time, so brief, in fact, if necessitated at all that but a trifling amount of heat will escape from the cars, and hence but an equally small equivalent of coal must be employed to restore the temperature within the cars to its normal state, thus effecting a great saving over the mail-collection system now in general use. Considering this saving, the interruption to the work of one or more of the "mail crew," and the other expenses entailed in the handling of the present mail-collection devices, they are expensive to operate.

The object of our invention is to provide a device whereby a mail-receptacle may be mechanically transferred to a moving car, which device shall possess advantages over the devices now in use or known to the art and which shall be free from their objectionable features.

To these ends our invention consists in means whereby a mail pouch, sack, bag, or other suitable mail-receptacle may be mechanically transferred from a suitable holding and delivering apparatus to a moving car without necessitating the opening of the mail-car door save after the pouch has been transferred for a period of time only long enough to permit of the pouch being disengaged from the engaging means and drawn or lifted into the car; in means whereby when the pouch-catching means secured to the car has been mechanically brought into operative position a signal announcing that fact will be given within the car; in means whereby when the pouch has been transferred to the bag-catching means secured to the car said transference will be made known within the car; in means whereby the pouch-catching means carried by the car and which is normally in inoperative position will be mechanically brought into operative position when at a predetermined distance from the mail crane or delivery apparatus; in means whereby the pouch-catching means may be locked in operative or in inoperative position; in means whereby the necessity of a signal being given from the engine to the mail crew will be done away with, while it further consists in the features of construction and combination hereinafter more fully described, and pointed out in the claims hereto annexed.

Again, referring to the drawings, Figs. 1 to 8, inclusive, A is a mail-car of any suitable construction; B, a cam-shaped third rail; D, a mail-crane of any suitable form; $d$, a mail-pouch; $a^{13}$, a pouch-engaging hook of any suitable form; $a$, a vertically-movable shoe carried by the car in such manner as to travel in the path of the member B; $a^5$, wires or other electric conducting members over which an electric current will pass from and return to a battery $a^4$ or other suitable source of electric supply; $a^6$, an electromagnet; $a^8$, a pivotally-movable armature; $a^9$, a catch or lug controlled by said armature and secured to or forming a part thereof; $a^{15}$, a spring controlling the armature $a^8$ and the catch $a^9$ and normally holding them away from the poles $a^7$ of the magnet by means of the lever $a^{16}$; $a^{10}$, a lever connected to and controlling the turning movement of the shaft or rod $a^{12}$, the turning of which latter in one or the other direction elevates or lowers the hook $a^{13}$; $a^{14}$, a cam-operated spring-catch; C, a cam-operated electric contact member or switch; $c$, a contact member with which the member C will come into contact when the latter is operated; $c^2$, wires or other electric conducting members over which when the member C is pressed against the member $c$ an electric current proceeding from a battery $c'$ or from any other suitable source of electric supply will pass to and control the electric bell $c^3$; $a^3$, a switch of any suitable type controlling the passage of an electric current over the wires $a^5$.

Assuming the car A to be moving past the member B and mail-crane D, by which latter the mail-pouch $d$ to be transferred to the train is held in such position as to lie in the path of the hook $a^{13}$ when the latter is in operative position, the operation of this form of our device is as follows: The shoe $a$ coming into contact with the cam-shaped member B, it and the contact member $a'$ carried by it will be elevated thereby until said contact member impinges against the contact member $a^2$, which, the switch $a^3$ being in closed position, will establish an electric circuit from the battery $a^4$ over the wires $a^5$ to the electromagnet $a^6$ and back to said battery. The passage of an electric current over said circuit energizes the poles $a^7$ of the magnet $a^6$, which will then cause the armature $a^8$ to pivotally move toward them. The described movement of the armature releases the catch $a^9$ from engagement with the lever $a^{10}$, whereupon said lever will be pulled down by the spring $a^{11}$ and the arm or shaft $a^{12}$ be turned, thus causing the hook $a^{13}$, carried and pivotally controlled by said shaft, to be lifted into operative position. In the course of its downward movement the lever $a^{10}$ causes the cam-operated contact member C to bear against the contact member $c$, thus establishing an electric circuit from the battery $c'$, over the wires $c^2$, to the electric bell $c^3$ and back to said battery. Said circuit being thus established a current passing over the same will cause the bell $c^3$ to ring, and this ringing of the bell will continue so long as the lever $a^{10}$ shall cause the contact members C $c$ to impinge against each other. Again, in the course of its downward movement the lever $a^{10}$ will come into contact with the cam-operated spring-catch $a^{14}$, which it will momentarily force out of its way, but which will immediately thereafter return to its normal position and by reason of its form secure the lever in its downward position, in which position it will hold the members C $c$ in electrical contact with each other. When said lever is thus secured, the hook $a^{13}$ being now locked in operative position will at the proper time engage the pouch $d$ in the well-known or in any suitable manner and remove it from the crane D. All of the above-described operations will be performed practically instantaneously and simultaneously upon the closing of the electric circuit controlling the operation of the armature $a^8$. After said bell-signal is given the collection clerk he may release the lever $a^{10}$ from its engagement by the catch $a^{14}$ and elevate it until it passes and is held in upward position by the cam-like armature-controlled catch $a^9$, which, together with the armature, will have assumed its normal position owing to the pull exerted by the spring $a^{15}$ upon the lever $a^{16}$. The operator may at a reasonable time after the signal is received by him remove the pouch from the hook, but as the raising of the lever in the manner above described depresses the hook, thereby swinging the pouch nearer the car-doorway, it may be found advisable to remove the pouch after the lever has been so raised. In any case the door need be open but a few moments.

In the form of our device above described the bell-signal will be continuously given from the time the hook is elevated until the operator shall restore it to its normal and inoperative position, while in Fig. 10 we have shown the bell-circuit-closing means controllable by the pouch. In this form of apparatus the bell-circuit will be completed only when the pouch shall come into contact with the contact member C and force it against the spring $c^4$ (the resistance offered by which it will overcome) and into contact with the contact member $c$, which contact will be maintained by the pressure of the pouch until the latter is removed or drops from the hook. The advantages of this form of apparatus are many, among which may be mentioned the following: If the pouch drops or is removed from the hook, the signal will cease, while if no pouch was present on the crane no signal will be given. Hence when a reasonable time has elapsed after the hook has been mechanically moved into operative position it may be returned to its inoperative position without necessitating the opening of the car-door to ascertain whether a pouch is or is not present on the hook. As a still further improvement in connection with that last mentioned, a signal, as the striking of a bell by the lever $a^{10}$ in its descent or in any suitable manner and by any suitable means, may be given to announce that the hook has been thrown into operative position in order that in event of the hook-signal not being sounded the attendant may know that a crane has been passed without collecting a pouch and that the device must be so reset that it will be operated by the next succeeding member B.

To render the device inoperative, even when the contact members $a'$ $a^2$ shall be brought into contact with each other, the switch $a^3$ may be moved into open position, thereby breaking the electric circuit over the wires $a^5$. When this is done, no electric current will pass to the electromagnet and operate the armature. Hence the lever $a^{10}$ will remain engaged by the catch $a^9$ against downward movement and the hook $a^{13}$ be held in inoperative position. Referring particularly to Fig. 6 of the drawings, $a$ is the member or shoe, hereinbefore referred to, which upon coming into contact with the member B is elevated in such manner as to cause the contact member $a'$ to impinge and bear against the contact member $a^2$ so long as the member B prevents the spring $a^{17}$ from exerting its normal function, which is to hold the shoe and the contact members $a'$ carried by it in such position that the contact members $a'$ $a^2$ will be out of contact.

$a^{19}$ is a spring composed of any material of suitable electric conductivity, which in this particular form of the parts now being described is in constant connection with the electric conducting member or wire $a^5$, substantially as shown in the drawings.

$a^{20}$ is a portion of the truck-frame, which is represented as constructed of electric conductive material. The current of electricity in actuating the armature $a^8$ of the electromagnet passes through or along the member $a^{20}$, thence to the shoe $a$ thereafter when the members $a'$ $a^2$ are in electrical contact to the said members $a^2$, whence it passes to the wire $a^5$ and energizes the electromagnet, with the results hereinbefore described, or said electric connections being made the electric current may move in the opposite direction to that described, the resultant effects being substantially identical. The proximity of the contact members $a'$ $a^2$ should be such that by the elevation of the shoe they will come into contact with each other before the spring $a^{17}$ shall have been compressed to the full extent permitted it. In order to permit of the spring $a^{17}$ being compressed after the contact members $a'$ $a^2$ have been brought into contact with each other, it is necessary that one or both of said contact members shall be vertically movable after said contact is made. In Fig. 6 we have shown the contact member $a'$ movable with the shoe $a$, while the contact member $a^2$ is shown as held in normal position by the spring $a^{19}$, which spring will of course be compressed when the member $a^2$ is forced upwardly by the upward movement of the shoe $a$ and the member $a'$. It is obvious that, if desired, either or both of the contact members $a'$ $a^2$ may be springs or connected to springs.

The advantage of making one or both of the contact members $a'$ $a^2$ movable after they are brought into contact is that the shoe may be permitted a certain movement up or down without breaking the contact of the members $a'$ $a^2$, which movement may be necessitated by irregularities in the height of the member B or which may be caused by the rocking of the car or car-truck.

Still referring to the drawings, $a^{21}$ is a frame or bracket to which the shoe $a$ is movably secured by means of the arms $a^{22}$ projecting into suitable slots $a^{23}$ and vertically movable therein.

In order that the hook $a^{13}$ may be turned about in such manner as to "pick up" mail when the car A is proceeding toward a crane D and member B at the right of said crane from a direction opposite to that hereinbefore described, it is necessary that the rod $a^{12}$, carrying the hook, shall be removable from the engaging member $a^{24}$ and the socket-sleeve $a^{31}$. (See Fig. 11.)

In Figs. 7 and 11 conjointly we have shown one form of device whereby the hook-carrying rod $a^{12}$ may be removably, but firmly, secured to the hook-controlling means. In said figures, $a^{24}$ is a member controlled by the lever $a^{10}$ and provided with a squared or other suitable shaped socket $a^{25}$, adapted to receive one or either of the squared or other suitable shaped extremities $a^{26}$ of the hook-controlling bar $a^{12}$; $a^{27}$, a pin, clench-pin, bolt, or other suitable securing means adapted to be inserted into a suitable hole $a^{28}$ in the socket member $a^{24}$ to engage the portion $a^{26}$ of the rod $a^{12}$ by passing therethrough or by entering a hole or slot therein. It is obvious that instead of one or both of the extremities $a^{26}$ being provided with a squared end adapted to enter a socket in the member $a^{24}$ either or both of said ends may be provided with a socket into which a portion of the member $a^{24}$ may be made to project and that any suitable securing means may be employed to properly hold said members together.

Where for any reason it may be necessary or desirable to manually operate the catch $a^9$ to throw it out of engagement with the lever $a^{10}$, and thereby cause the hook $a^{13}$ to be brought into operative position to engage a mail-receptacle, the following or any suitable means may be employed to render the device so manually operable. One form of the device referred to is shown in Figs. 1, 4, and 5, in which $a^{32}$ indicates a rod, pin, chain, or other suitable member secured to the lever $a^{16}$. If the member $a^{32}$ be pulled downward, the lever $a^{16}$ will likewise be pulled downward against the resistance of the spring $a^{15}$, thereby throwing the catch $a^9$ out of engagement with the lever $a^{10}$. It is obvious that the above result may be manually obtained in many different ways and that, if desired, it may be worked by the foot of the operator, a suitable pedal or other foot-controlled means being employed.

It is further obvious that the shoe $a$ and the contact members $a'$ $a^2$, controlled thereby, may be secured to the car or car-truck at any suitable point and in any suitable manner; that the bearing-surface of the shoe $a$ may be given any suitable form; that the member B may be of any preferred form and height and located either at the side of the railway-track E, as shown in Fig. 2, or between the rails constituting the track; that said member may be of any desired length and located at either side of or extend to and on both sides of the crane D, it being only necessary that it shall be struck by the shoe $a$ a sufficient distance from the crane to permit the hook $a^{13}$ and the parts controlling it to be properly moved into operative position before the crane is reached; that instead of ringing a bell $c^3$ the electric current passing over the wires $c^2$ may cause an electric light to burn or glow or operate any other suitable electrically-controlled signal or indicating device; that the inoperative position of the hook $a^{13}$ may instead of being that shown in the drawings be above the rod $a^{17}$, and therefore be required to descend in order to come into operative position, in which case the spring $a^{11}$ should pull upwardly upon or bear upwardly against the lever $a^{10}$, and the parts controlling or controlled by said lever should be so disposed as to effect the results hereinbefore described, and it is further obvious that the number, size, form, and location of the various parts of our device may be greatly varied without departing from the principle of the invention.

Having thus described our invention, what we claim as new, and desire to secure by Letters Patent, is—

1. In a railway mail-collection device, the combination of a car, a mail-receptacle-engaging member, means, in part carried by the car, whereby said engaging member will be brought into operative position to engage a mail-receptacle, and means for locking said member in said position, substantially as described.

2. In a railway mail-collection device, the combination of a car, a mail-receptacle-engaging member, locking means adapted to engage said member and retain it in inoperative position, means, in part carried by the car, whereby said locking means will be operated to release said member, and means whereby said member, when released from engagement with the locking means, will be brought into operative position to engage a mail-receptacle, substantially as described.

3. In a railway mail-collection device, the combination of a car, a mail-receptacle-engaging member, means, in part carried by the car, whereby said engaging member will be brought into operative position to engage a mail-receptacle, and signal means controlled by said engaging-member-controlling means, substantially as described.

4. In a railway mail-collection device, the combination of a car, a mail-receptacle-engaging member, a lever secured to said member and controlling its movement into or out of operative position, and means, in part carried by the car, whereby said lever will be moved to bring said member into operative position to engage a mail-receptacle, substantially as described.

5. In a railway mail-collection device, the combination of a car, a mail-receptacle-engaging member, a lever secured to said member and manually controllable to move it into inoperative position, and mechanical means whereby said lever will be moved to bring said member into operative position to engage a mail-receptacle, substantially as described.

6. In a railway mail-collection device, the combination of a car, a mail-receptacle-engaging member, a lever secured to said member and manually operable to move it into inoperative position, means adapted to engage said lever and thereby to hold said member in said position, means, in part carried by the car, whereby said lever will be released from engagement with said holding means, and means whereby said lever, when released from said holding member will be operated to bring the engaging member into operative position to engage a mail-receptacle, substantially as described.

7. In a railway mail-collection device, the combination of a car, a mail-receptacle-engaging member, a spring adapted to move said member into operative position to engage a mail-receptacle, and means whereby said member will be locked in said position, substantially as described.

8. In a railway mail-collection device, the combination of a car, a mail-receptacle-engaging member, locking means mechanically controlled to hold said member in inoperative position and electrically controlled to release said member, and means whereby said member, when released, will be brought into operative position to engage a mail-receptacle, substantially as described.

9. In a railway mail-collection device, the combination of a car, a mail-receptacle-engaging member, locking means adapted to engage said member, mechanical means controlling said locking means to hold said member in inoperative position, electric means controlling the release of said member from engagement with the locking means, and means whereby said member, when released, will be brought into operative position to engage a mail-receptacle, substantially as described.

10. In a railway mail-collection device, the combination of a car, a mail-receptacle-engaging member, locking means adapted to engage said member, mechanical means controlling said locking means to hold said member in inoperative position, electromagnetic means controlling the release of said member from engagement with the locking means, and means whereby said member, when released, will be brought into operative position to engage a mail-receptacle, substantially as described.

11. In a railway mail-collection device, the combination of a car, a mail-receptacle-engaging member, spring-controlled locking means whereby said member will be held in inoperative position, and an electromagnet adapted to release said member from engagement with said holding means, substantially as described.

12. In a railway mail-collection device, the combination of a car, a mail-receptacle-engaging member, a lifting member, B, an electric contact-shoe carried by the car and adapted to be raised by said lifting member when it shall come into contact therewith, an electric circuit which will be closed when said shoe is lifted, but which will be open normally, electric-current-supply means for said circuit, and means controlled by a current of electricity passing over said circuit whereby said mail-receptacle-engaging member will be brought into operative position to engage a mail-receptacle, substantially as described.

13. In a railway mail-collection device, the combination of a car, a mail-receptacle-engaging member, means for locking said member in inoperative position, electrically-controlled means for disengaging said member from said locking means, a normally open electric circuit carried by the car, a member B, a circuit-closing member carried by the car and adapted to be operated by the member B, current-supply means for said circuit, and means adapted to move said engaging member into operative position to engage a mail-receptacle when an electric current shall pass over said circuit and operate said locking means, in the manner, and for the purpose, substantially as described.

14. In a railway mail-collection device, the combination of a car, a mail-receptacle-engaging member, a lever secured to and controlling said engaging member, whereby it will be moved into or out of operative position, and mechanically-controlled signal means, substantially as described.

15. In a railway mail-collection device, the combination of a car, a mail-receptacle-engaging member, means, in part carried by the car, whereby said engaging member will be brought into operative position to engage a mail-receptacle when at a predetermined distance therefrom, and signal means controlled by said engaging-member-controlling means, substantially as described.

16. In a railway mail-collection device, the combination of the following elements, viz: electric contact members, $a'$, $a^2$; an electric circuit $a^5$; an electromagnet, $a^6$, in said circuit; an armature, $a^8$, controlled by said electromagnet; a catch, $a^9$, adapted when in normal position, to project outwardly in the path of movement of the lever, $a^{10}$; a spring, $a^{15}$, adapted to hold said catch in normal position; an armature controlled by the electromagnet, $a^6$, to move the catch $a^9$ out of the path of movement of the lever $a^{10}$; said lever; and a mail-pouch-engaging hook, $a^{13}$, mounted on a bar, $a^{12}$, and controlled by the lever $a^{10}$; all arranged and disposed substantially as described.

17. In a railway mail-collection device, the combination of the following elements, viz: a mail-receptacle-engaging hook, $a^{13}$; a normally open electric circuit, $c^2$; electrically-controlled signal means, $c^3$, in said circuit; contact members, C, c, adapted, when in contact with each other, to close the electric circuit $c^2$; and electric-current-supply means; all arranged and disposed in the manner and for the purpose, substantially as described.

18. In a railway mail-collection device, the combination of the following elements, viz: electric contact members, $a'$, $a^2$; circuit-wires, $a^5$; an electromagnet, $a^6$, in circuit with said wires; an armature, $a^8$, controlled by said electromagnet, and itself controlling a catch, $a^9$, to move it out of the path of movement of the lever, $a^{10}$; a catch, $a^9$, adapted when in normal position, to project outwardly into the path of movement of the lever $a^{10}$; a spring, $a^{15}$, adapted to hold said catch in normal position; a mail-pouch-engaging member, $a^{13}$, mounted on a bar, $a^{12}$, and controlled by the lever, $a^{10}$; and a switch $a^3$; all arranged and disposed substantially as described.

19. In a railway mail-collection device, the combination of a car, a mail-receptacle-engaging member, a lever secured to said member and manually operable to move it into inoperative position, means adapted to engage said lever and thereby to hold said member in said position, hand or foot operated means whereby said lever will be released from engagement with said holding means, and mechanical means whereby said lever, when released from engagement with said holding member, will be operated to bring the engaging member into operative position to engage a mail-receptacle, substantially as described.

CARL A. PFANSTIEHL.
LEWIS A. PEASE.
JOHN A. BRADY.

Witnesses:
CHARLES S. HILL,
LYSANDER HILL.